(12) United States Patent
Van Gael et al.

(10) Patent No.: US 11,348,032 B1
(45) Date of Patent: May 31, 2022

(54) AUTOMATED GENERATION OF MACHINE LEARNING MODELS

(71) Applicant: Meta Platforms, Inc., Menlo Park, CA (US)

(72) Inventors: Jurgen Anne Francois Marie Van Gael, Cambridge (GB); Yu Ning, Sunnyvale, CA (US); Hao Shi, Newark, CA (US); Fei Xie, Redwood City, CA (US); Bingyue Peng, San Jose, CA (US); Shyamsundar Rajaram, San Francisco, CA (US); Xin Liu, Fremont, CA (US); Zhen Yao, Palo Alto, CA (US); Peng Yang, Sunnyvale, CA (US); Robert Oliver Burns Zeldin, Los Altos, CA (US); Piyush Bansal, Menlo Park, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 813 days.

(21) Appl. No.: 16/120,279

(22) Filed: Sep. 2, 2018

(51) Int. Cl.
*G06N 20/00* (2019.01)
*G06F 8/30* (2018.01)

(52) U.S. Cl.
CPC .............. *G06N 20/00* (2019.01); *G06F 8/31* (2013.01)

(58) Field of Classification Search
None
See application file for complete search history.

(56) References Cited

U.S. PATENT DOCUMENTS

| | | | | |
|---|---|---|---|---|
| 10,375,098 | B2* | 8/2019 | Oliner | G06N 5/003 |
| 2015/0127590 | A1* | 5/2015 | Gay | G06Q 30/0242 |
| | | | | 706/12 |
| 2015/0242760 | A1* | 8/2015 | Miao | H04L 67/42 |
| | | | | 706/12 |
| 2015/0379072 | A1* | 12/2015 | Dirac | G06N 20/00 |
| | | | | 707/693 |
| 2018/0239593 | A1* | 8/2018 | Miyamoto | G06F 8/30 |
| 2018/0365565 | A1* | 12/2018 | Panciatici | G06K 9/6255 |
| 2019/0303980 | A1* | 10/2019 | Yan | G06N 20/00 |
| 2019/0340520 | A1* | 11/2019 | Oyamada | G06Q 30/02 |

OTHER PUBLICATIONS

Jiang et al., "Angel: a new large-scale machine learning system," Oxford University Press, 2017, 21pg. (Year: 2017).*
Olson et al., "TPOT: A Tree-based Pipeline Optimization Tool for Automating Machine Learning," ICML, 2016, 9pg. (Year: 2016).*
Vartak et al., "MODELDB: A System for Machine Learning Model Management," ACM, 2016, 3pg. (Year: 2016).*

* cited by examiner

*Primary Examiner* — Ryan D. Coyer
(74) *Attorney, Agent, or Firm* — Fenwick & West LLP (57) ABSTRACT

Machine-trained models are generated based on a model description that defines parameters for training the model and that can inherit parameters from parent model descriptions. When a parent model description changes, the changes made to the parent model description are applied to the model description automatically. When a target model is re-generated, a description of the set of parameters for generating the target model is received. The parent model is then identified from the received description, and a description of the set of parameters for generating the parent model is retrieved. Using the description for the target model and the parent model, a pipeline for generating the target model is generated. Finally, the pipeline is executed to generate the target model.

20 Claims, 4 Drawing Sheets

```
class Model_A(Parent_Model_A):
    def __init__(self):
        super(Parent_Model_A, self).__init__()

def get_pipeline(self, pipeline, context):
        pipeline.add_workflow( ... )
        pipeline.add_transform( ... )
        pipeline.add_transform( ... )
        pipeline.add_transform( ... )
        pipeline.remove_transform( ... )
```

AUTOMATED GENERATION OF MACHINE LEARNING MODELS

BACKGROUND

This disclosure relates generally an automated generation of machine learning models across different tasks.

Machine learning models are used by various online systems to analyze a vast amount of information and make predictions based on available data. Machine learning models are constantly evolving and a typical system may use a large number of models to predict a large number of events that are of interest to the system. For example, a social networking system (SNS) may use machine learning models to predict the likelihood that users will be interested in a particular set of content items, to predict the likelihood that a user will like to connect to another user of the SNS, and to identify the people present in an image provided to the system.

The various models used by the online system are managed or maintained by engineers. As the number of models used by the online system increases, the amount of work for maintaining the various models used by the online system can greatly increase. For example, if a new feature or architecture is developed that can improved some of the models used by the online system, engineers that manage or maintain those models would have to manually modify the models to include the new features or architecture to take advantage of the improvements provided by those new features or architecture.

Moreover, manually maintaining a model makes the model prone to errors introduced by the engineer modifying the model. The errors introduced to the various models may reduce the accuracy of the models or may increase the time to deployment of the model due to an increased time used to debug the model.

As such, there is a need for a scheme to automate the management and maintenance of a set of machine learning models used by an online system.

SUMMARY

Machine learning models are constructed in a hierarchical manner. Engineers developing a machine learning model compose a description file that includes a reference to another model, and includes instructions for modifying the other model. In other words, the description file provided by the engineer for the machine learning model specifies a set of dependencies the model depends or inherits from (parent models) and a set of instructions for modifying the parent models. Instead of starting from scratch, an engineer may use a pre-existing model as a starting point and modify the architecture or characteristics of the pre-existing model. The modifications of the pre-existing model is then coded in a file that can be interpreted by a compiler.

A pipeline compiler generates a pipeline for generating the model based on the specified dependencies in the description file for the model. The description file for the machine learning model modifies the parent models by adding, removing, or modifying features or characteristics of the parent model. The pipeline compiler accesses a description file for the parent models and the instruction for modifying the parent models, and generates a configuration file for configuring a pipeline executor that generates the model.

When the configuration for a parent model is modified, every model that inherits its configuration from the parent model (e.g., a child model) is automatically modified in the same manner without an engineer having to manually modify the children models to apply the modification of the parent model. When a child model is re-generated, the latest version of the configurations for generating the child model is used, including every modification applied to the parent model, is used to re-generate the model. For example, an engineer maintaining the parent model modifies the parent model to increase the number of layers of a neural network of the parent model. When the child model is re-generated (e.g., as part of a scheduled task that periodically re-generates the model), the modification of the parent model that increases the number of layers of the neural network is identified and automatically applied to the child model. That is, the number of layers in the neural network of the child model is also increased accordingly.

In some embodiments, the description file of the model is provided in a programming language, which is executed by the pipeline compiler. That is, the instructions for modifying the parent model is defined using a programming language (e.g., python). The pipeline compiler executes the description of the model to generate a configuration file used for configuring a training module for training the model. When executing the description of the model, the pipeline compiler retrieves the latest version of the parent model and modifies the pipeline of the parent model as specified in the description of model. As such, any modifications made to the pipeline of the parent model prior to the generation of the target model is captured when generating the pipeline of the target model.

In some embodiments, an engineer in charge of a target model is notified when a model the target model depends from is modified. For example, if the parent model of the target model is modified, the engineer in charge of the target model is notified with the changes made to the parent model. The engineer may then analyze the modification made to the parent model to determine whether to keep the modification or remove the modifications made to the parent model.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Configuration Overview

Online systems use machine leaning models to perform various tasks from selecting content items a user may be interested in, to detecting whether the security of an account of a user has been compromised. For each use of machine learning model, a new model is generated taking into consideration multiple constraints, such as, computing power of the system using the model, desired accuracy of the model, latency in applying the model, training samples and training process, features used for the model, and so forth. As such, some systems may have a large number of machine learning models that have to be maintained. For example, an online system may want to update the models used by the online system when a new improvement is found that can improve the execution of a model of the online system. If the online system has many models that can benefit from the improvement, modifying each model independently can be a time consuming and error prone process.

Instead, as discussed below, in embodiments described herein, machine learning models are constructed in a hierarchical manner, where a parent model is used as a starting point for constructing multiple child models. Each of the child models is represented using a description file that describes this hierarchy by specifying which parent models the child model depends or inherits from. The description file then includes instructions for modifying the parent model when used for the child model. When generating each of the child models, a description file for the parent model, which specifies how the parent model is to be generated (e.g., parameters and process for training the parent model), is accessed and modified based on the instructions.

As such, if a new improvement is found for the parent model, the description file for the parent model can be modified to include the new improvement. As a result, each of the child models, when the child models are generated or re-generated, will also benefit from the new improvement, even if the description files for the child models are not modified to include the new improvement. That is, since the child models are derived from the parent model, any modification to the parent model is propagated to each of the child models by virtue of the dependency from the parent model.

System Architecture

Figure 1:
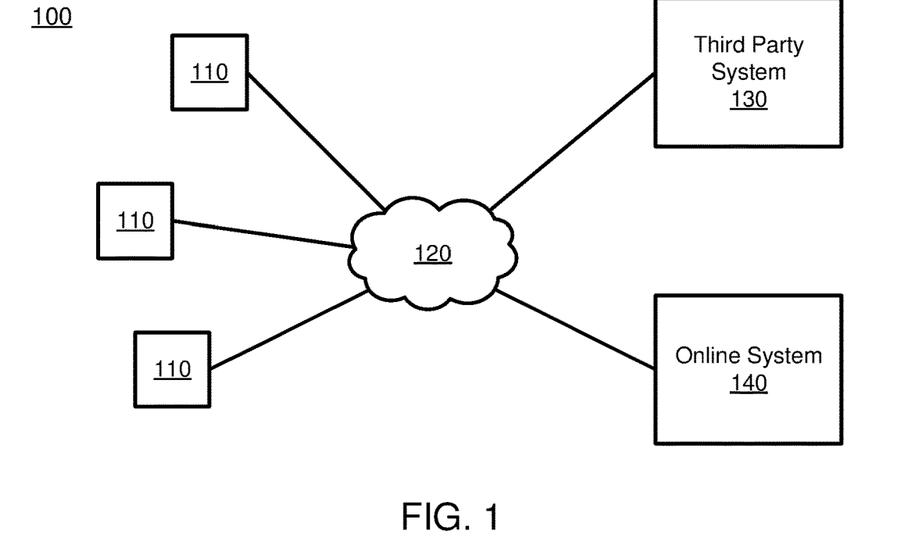
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

An online system 140 is a computing device (e.g., a computer server) that can be accessed by the one or more client devices 110 for providing a particular functionality to the client devices 110. An example of an online system 140 is a social networking system that provides web pages that include a feed of content items that are associated with users that a user of a client device accessing the social networking system is connected to. The online system maintains multiple machine learning models used for providing the online system's functionality. The machine learning models are generated by a model generator that trains models based on a representation of the model provided by an engineer or programmer developing the model.

Figure 2:
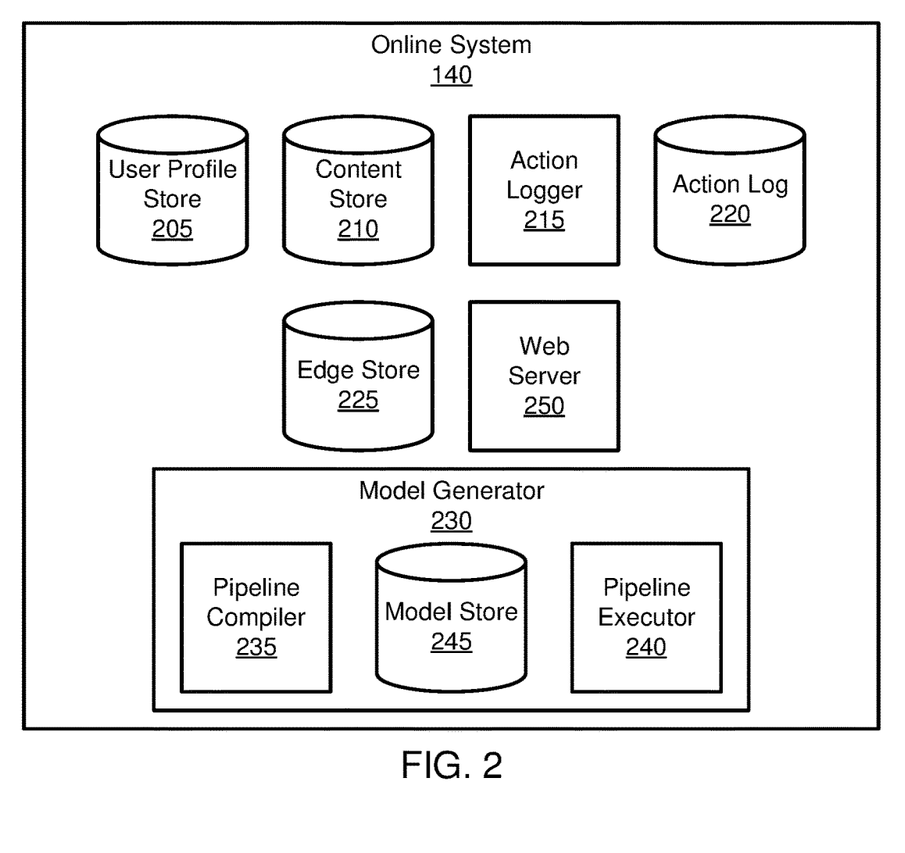
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a model generator 230, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The online system 140 provides contents stored in the content store 210 to users of the online system. The online system 140, for example, uses machine learned models to select content items the user might be interested in, and generates a feed that is included in a user interface provided to a client device 110 of the user. The models used for selecting the content items may take into consideration interactions by the user with content items previously sent to the user. For example, the models may identify content items that have similarities to content items that were tagged with a "like" by the user.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, etc. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executed on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time (e.g., using machine learned models) to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The model generator 230 receives a model description and generates a model based on the received model description. Each model generated by the model generator 230 provides the ability to provide an output from a set of given inputs without being explicitly programmed to do so. For example, a model is used to predict a certain action, such as whether a user will click on a content item. In another example, a model is used to generate a description of a feature itself, such as generating an embedding vector for a content item from information about a set of users have interacted with the content item.

The models generated by the model generator 230 are trained to generate the output by analyzing a set of training data (a training set). As used herein, training a model includes determining a set of parameters used by the model to generate the output. The set of parameters may be a set of coefficients or weights used by the model in a set of equations that were programmed by model generator 230. A model description is a file that instructs the model generator 230 on how to program and train a model to be generated. In some embodiments, the model description is a file that is written in a human readable format. The model description may include a set of dependencies that allow a model to be based one or more models. That is, the model description includes instructions on how to combine model descriptions for multiple other models, or how to modify a model description for another model to generate a new model. The model generator 230 includes a pipeline compiler 235, a pipeline executor 240, and a model store 245.

Figure 3A:
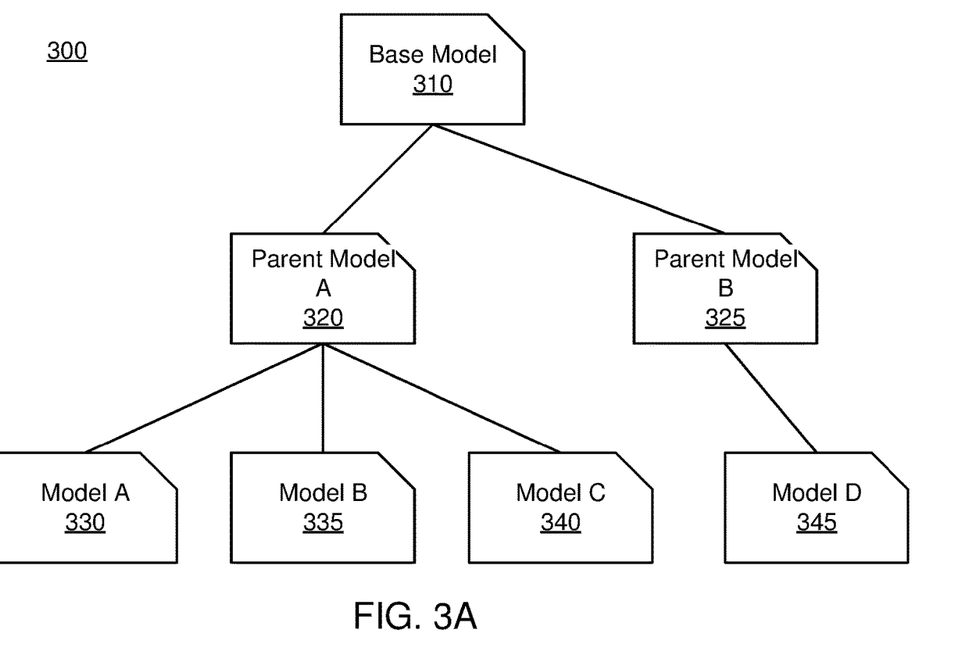
FIG. 3A is a diagram showing a dependency tree for various machine learning models of an online system, in accordance with an embodiment.

The pipeline compiler 235 receives a description of a target model and generates a configuration file for configuring the pipeline executor 240 to generate the target model. In some embodiments, the configuration file includes attribute-value pairs that the pipeline executor 240 is programmed to interpret. The pipeline compiler parses the description of the target model and identifies the dependencies of the target model. Dependencies are other models stored in the model store 245 the target model depends from. In other words, dependencies are other models the target model inherits characteristics from. For instance, the target model has a parent model that the target model modifies to customize the parent model. FIG. 3A shows a tree diagram of an example architecture of models used by an online system, and FIG. 3B shows an example description of a target model.

FIG. 3A shows a tree diagram of an example dependency tree of models used by an online system. The tree 300 shown in FIG. 3A has a base mode 310. The base model is then inherited by parent model A 320 and parent model B 325. That is, parent model A 320 and parent model B 325 modify the base model 310. The tree 300 then includes three models that depends on or inherit from parent model A 320 (e.g., model A 330, model B 335, and model C 340), and a single model that depends on or inherits from parent model B 325 (model D 345).

Figure 3B:
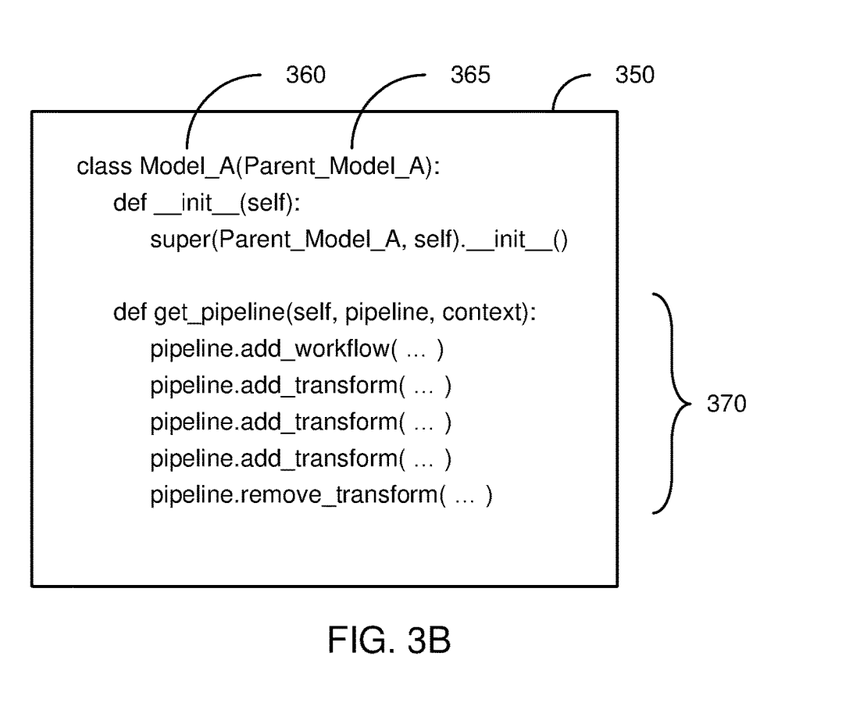
FIG. 3B shows an example description of a model, in accordance with an embodiment.

FIG. 3B shows an example model description of model A 330. The description 330 is written in a programming language or a markup language. For example, the model description 330 of FIG. 3B is provided based on the python programming language. The description 350 of model A 330 includes a name 360 (Model_A) and a base model 365 (Parent Model_A). As such, Model_A inherits characteristics and features from Parent Model_A. If the description of Parent Model_A changes, when Model_A is re-generated, the changes in the description of Parent Model_A is reflected in the re-generated Model_A. Similarly, if any model Parent Model_A inherits from changes (e.g., base model 310), the changes in the description of the model Parent Model_A depends from is reflected in both Parent Model_A and Model_A when they are re-generated to reflect the changes made to the description of the model Parent Model_A inherits from. As used herein, characteristics and features a model may inherit from a parent model includes an input format or structure, an output format or structure, a model structure, model training parameters (e.g., number of nodes in the model, how the nodes are connected, or number of layers in a neural network) and model building processes (e.g., how to conduct feature selection, how to conduct parameter sweeping on model training parameters).

The description 350 additionally includes a series of steps 370 to modify the parent model process. Modification that can be included in the description 350 include adding or removing a workflow and adding or removing a transform of a workflow. A workflow is the basic execution unit in the model building process, and defines the steps for performing the related function in building the model. A transform is a modification of a setting of a workflow. Example workflows include workflows for feature selection, architecture sweeping, parameter sweeping, and generating a final output model.

Feature selection refers to the process for evaluating and selecting a set of features for the model to use as inputs to the model in operation. In large, dynamic data sets, such as those in social networking, data sets may include a very large number of types of values and characteristics that could be used as a feature to describe an item for a model to use in evaluating the item. Feature selection thus refers to the analysis and selection of certain of those features to subject to various constraints such as a total number of features that may be used in the model or a total amount of storage space available to represent the features to be used. One example workflow for feature selection may have an initial step to identify candidate features from a dataset, and a second step to evaluate or select the features for use in the model. For example, the workflow for this step may define and apply filters for identifying candidate features from different types of data in the raw training data set. One such filter may apply a threshold to a type of data to require a sufficient amount of that data is present to be a useful predictor. The process for identifying the candidate features may also include processing or modifying the training data to generate features, for example by processing the data to generate features representing latent characteristics of the data such as embeddings describing interactions between two types of objects. As a second step in this example workflow, the features may then be evaluated to select candidates for use in the operational model. This step may specify the processes for evaluating candidates and the constraints to be optimized for in the selection. For example, the candidates may be evaluated by training various models using different sets of features and evaluating the effect on model performance when a feature is included or excluded. When a child model modifies a parent feature selection workflow, that modification may designate an additional set of steps for feature selection, or apply a transform to define or override parameters for feature selection. For example, a transform may specify that a certain set of features must be included for that child model, which may override normal pruning of those features.

Architecture sweeping workflows refer to workflows for evaluating and selecting different network model architectures. For example, various network architectures and configurations may be evaluated to determine a set of network architectures that perform well for the given model. The workflow may define the types of architectures to be evaluated along with the means for evaluating the candidate architectures. For example, the possible architectures may include different numbers of layers, transformations between layers, connections between layers, and so forth. These different architectures may present different computational requirements and have different model predictive accuracy. As an example for an architecture sweeping workflow, a child model may modify how the set of candidate models is evaluated, and may include transforms designating thresholds or other parameters for evaluating the models, for example to set maximum computational requirements for applying an architecture, a maximum computation time, or specifying a maximum in-use memory footprint for the architecture.

Parameter sweeping workflows refer to workflows for evaluating and selecting hyperparameters for the model architecture. These hyperparameters may vary according to different types of architectures and include parameters that affect model learning and may include other parameters of the model different from the evaluation of the model. Example hyperparameters in various types of models include tuning parameters for loss functions, learning rate, step size for gradient descent algorithms, number of clusters for k-means clustering, and batch size for the training data. To evaluate parameters, the parameter sweeping workflow may implement a process for identifying preferred parameters, such as a grid search, Bayesian optimization, or random search among the hyperparameters. As example modifications to a parameter sweeping workflow, a child model may modify steps for evaluating parameters or may specify a transform to modify the evaluated range of the parameters. For example, a child model may include a transform specifies a learning rate between 0.01 and 0.02.

A workflow that generates the output model designates the process for training the output model given the results from other workflows. That is, the workflow may specify how to apply the features, models, and hyperparameters (along with any other characteristics) to train and generate the output model. This workflow may also designate a given set of training data to be used, apply training parameters, and so forth. As one example, a child model may modify the data set to be used in the final model parameter, for example designing training data for a particular subset of users to be used in the final model training, which may differ from the training set used in feature selection or model evaluation.

In the example of FIG. 3B, model A 330 adds a workflow, adds three transforms, and removes one transform from the description of parent model A 320. In some embodiments, the pipeline compiler 235 executes each of the steps 370 in sequence and generates a configuration file. For instance, the steps included in the description 350 modify values in one or more attribute-value pairs of the pipeline of the parent model. The modification of the one or more attribute-value pairs would then modify the configuration of the pipeline executor 240, resulting in a modified model being generated by the pipeline executor 240. In the example of FIG. 3B. In some embodiments, the pipeline compiler 235 ignores an add command for features that are already included in the parent model. Similarly, the pipeline compiler 235 ignores remove commands for features that are not in the parent model. In other embodiments, the pipeline compiler 235 provides an error message if a step adds a feature that is already included in the parent model, or removes a feature that is not included in the parent model.

In some embodiments, the description 350 for a specific model further identifies other models that use as inputs one or more outputs from the specific model, or one or more other models whose outputs are used as inputs to the specific model. The model generator 230 may use this information to determine when to re-generate the models. For instance, if a model whose outputs are used as inputs to a specific model is modified, the model generator 230 may re-generate the specific model to capture the changes of the model whose outputs are used as inputs.

Referring back to FIG. 2, the pipeline compiler 235 notifies an administrator of a particular model if a parent model changes in a way that affects the target model. Likewise, when an inheriting model (e.g., a child model) is modified, administrators of the model being inherited (e.g., the corresponding parent model) may be notified. The administrator of the particular model may then decide to modify the model. For example, the administrator of the model may revert back some of the changes that were applied or implement those changes to the subject model. In some embodiments, an administrator of a parent model is notified if a model that inherits from the parent model is modified or created. For example, and with reference to FIG. 3A, if model D 345 is modified, the administrator of parent model B 325 is notified. In some embodiments, if model D 345 is modified, the administrator of both parent model B 325 and base mode 310 are notified.

In some embodiments, the administrators of models can subscribe to other models for being notified when a model the administrators are subscribed to changes. For example, the administrator of model C 340 can subscribe to be notified when model A 330 changes. As such, the administrator of model C 340 may analyze the changes made the model A 330 and may decide to modify model C 340 accordingly.

The pipeline executor 240 parses the configuration file generated by the pipeline compiler 235 and generates a model based on the configuration file. In some embodiments, the pipeline executor further receives metadata that includes additional configuration and parameters used to generate the model. The configuration file includes a description of the pipeline for generating the target model. For instance, the configuration file includes a description of the model architecture, an identification of the training set for training the model, a description of the features to be used as inputs for the model, the model building process, etc. In contrast to a model description described above, a configuration file does not include dependencies to other models. Moreover, the configuration file is written in a format that is easily readable by the pipeline executor 240 and not necessarily as human readable as the model description. Furthermore, the configuration file includes instructions or parameters for configuring the pipeline executor 240, as opposed to instructions for modifying a description of a different model.

Metadata provided to the pipeline executor 240 includes, for example, constraints to be used by the pipeline executor 240 for generating the model and training sets to be used for training the model. For example the metadata for the training sets include an identification of the training samples and labels associated with each of the training samples to be used for performing a supervised learning algorithm for training the model. This metadata may also include processing and memory constraints (e.g., upper bounds) for the model, services which may use the model, etc.

In some embodiments, the configuration file includes parameters for performing an evaluation of different architectures. The parameters for performing the evaluation of the different architectures are derived by the pipeline compiler 235 from the description of the model and the description of the parent model of the model. The pipeline executor 240 sweeps a set of available architectures based on the parameters included in the configuration file. In some embodiments, the configuration file identifies a set of architectures that the pipeline executor 240 may consider for the architecture sweep. In other embodiments, the configuration file identifies one or more architectures not to be used by the pipeline executor 240 during the architecture sweep. In one embodiment, the architecture sweep scheme describes a process for determining the viability of the various architectures being tested during the sweep, or an algorithm for determining a score for assessing the performance of the various architectures being tested during the sweep. Based on the architecture sweep, the pipeline executor 240 selects one architecture for the target model.

The model store 245 stores multiple models and model descriptions used by the online system. The pipeline compiler 235 searches the model store 245 for dependencies of a target model when compiling the pipeline of the target model. In some embodiments, the model store 245 further stores the pipelines generated by the pipeline compiler for the models stored in the model store. In some embodiments, the model store 245 enforces the integrity of the dependencies between models. For example, the model store 245 may prevent models from being deleted if other models depend from the model to be deleted. In another example, the model store 245 may prevent a model from being saved or updated if the model depends from a model that is not stored in the model store. Furthermore, the model store 245 may prevent conflicts between models. That is, the model store 245 may prevent a model from being stored if the model to be stored has a same name as another model already stored in the model store.

The models generated by the model generator 230 are deployed to various modules of the online system for enabling various features of the online system 140. For instance, models may be deployed to a content selection module (not shown) to generate a feed of content items for being presented in a user interface to a user of the online system 140. In some embodiments, the deployed models are stored locally by a module using the model. In other embodiments, the models are accessed by the various modules of the online system 140 via an API.

Referring back to FIG. 2, the web server 250 links the online system 140 via the network 120 to the one or more client devices 110, as well as to the one or more third party systems 130. The web server 250 serves web pages, as well as other content, such as JAVA®, FLASH®, XML and so forth. The content provided by the web server 250, for example, is selected from the content store 210 using a model generated by the model generator 230. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Automated Model Generation

Figure 4A:
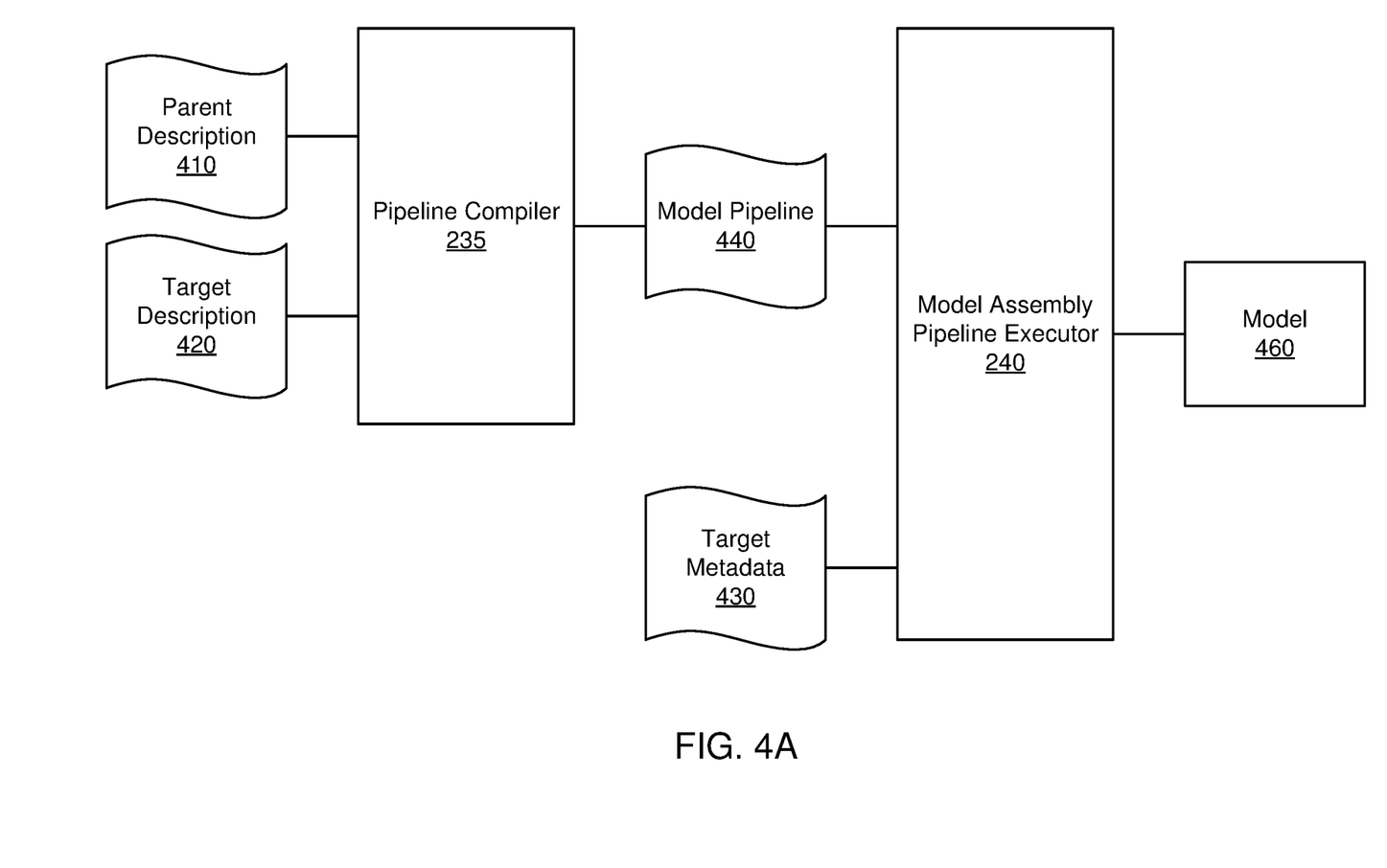
FIG. 4A is a block diagram of a system for generating a machine learning model, in accordance with an embodiment.
Figure 4B:
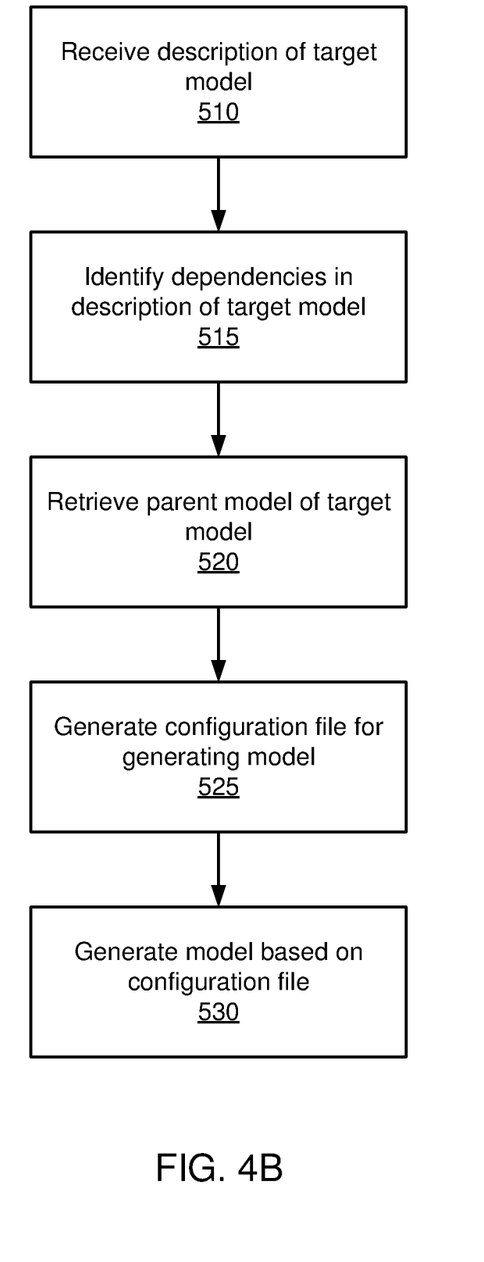
FIG. 4B is a flow diagram of a process for generating a machine learning model, in accordance with an embodiment.

FIG. 4A is a block diagram of a system for generating a machine learning model, in accordance with an embodiment. FIG. 4B is a flow diagram of a process for generating a machine learning model, in accordance with an embodiment. The pipeline compiler 235 receives 510 a description of a target model 420. The description of the target model 420 is provided using a programing language syntax (e.g., python). The pipeline compiler 235 identifies 515 a parent model the target model depends from. For example, if the target model is model A 330 of FIG. 3A, the pipeline compiler 235 identifies parent model A 320 as a model that model A 235 depends from.

The pipeline compiler 235 requests and retrieves the description 410 of the identified parent model from the model store 245. In some embodiments, the pipeline compiler 235 further identifies models the parent model depends from. For example, referring back to the example of FIG. 3A, the pipeline compiler 235 identifies base model 310 as a model parent model A 320 depends from. In this example, the pipeline compiler 235 further requests and retrieves the description of the base model 310 from the model store 245.

The pipeline compiler 235 generates 525 a model pipeline 440 for generating the target model. In some embodiments, the model pipeline 440 is generated as a configuration file (e.g., a j son file) for configuring the pipeline executor 240.

The pipeline executor 240 receives the model pipeline 440 and generates the model 460. In some embodiments, the pipeline executor 240 further receives metadata information 430 for generating the model 460 describing additional parameters for training the model. The pipeline executor 240 selects the architecture for the model, selects the hardware for training the model, and controls the selected hardware for training the model.

In some embodiments, the steps of FIG. 4B are repeated to re-generate the model. For instance, the model is periodically re-generated to update the architecture to take advantage of new architectures that were developed since the last time the model was generated, or to re-train the model based on new data that is available to the online system.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving a description of a set of parameters for generating a target model that inherits from a parent model, the description of the set of parameters for generating the target model provided using a programing language syntax, the description of the set of parameters including an identification of the parent model the target model inherits from;
identifying the parent model from the received description of the target model;
retrieving a description of a set of parameters for generating the parent model, the description of the set of parameters for generating the parent model provided using the programing language syntax;
generating a pipeline for generating the target model based on the retrieved description of the set of parameters for generating the parent model and the received description of the set of parameters for generating the target model, wherein the generated pipeline does not include a reference to the parent model; and
executing the generated pipeline to generate the target model.

2. The method of claim 1, wherein generating the pipeline comprises:
modifying a pipeline associated with the parent model based on steps listed in the description of the set of parameters for generating the target model.

3. The method of claim 1, further comprising:
selecting a model architecture based on the generated pipeline; and
training the target model based on the generated pipeline.

4. The method of claim 3, wherein selecting the model architecture comprises:
evaluating a plurality of model architectures following a scheme described in the generated pipeline.

5. The method of claim 1, further comprising:
receiving a modification to the description of the set of parameters for generating the parent model; and
notifying a manager of the target model that the description of the set of parameters for generating the parent model has been modified.

6. The method of claim 1, wherein generating the pipeline for generating the target model comprises generating a configuration file for configuring a hardware for training the target model.

7. The method of claim 6, wherein executing the generated pipeline comprises:
configuring a hardware component for training the target model; and
training the target model using the hardware component.

8. The method of claim 1, wherein the description of the set of parameters for generating the target model is provided as a class written using the programming language syntax, the class inheriting from a second class corresponding to the parent model, the class further including a function for defining the pipeline of the target model.

9. The method of claim 1, wherein the function for defining the pipeline of the target model including one or more steps for modifying a pipeline of the parent model.

10. The method of claim 8, wherein generating a pipeline comprises:
   executing the function defining the pipeline of the target model.

11. A non-transitory computer readable storage medium storing instruction that, when executed by a processor, cause the processor to:
   receive a description of a set of parameters for generating a target model that inherits from a parent model, the description of the set of parameters for generating the target model provided using a programing language syntax, the description of the set of parameters including an identification of the parent model the target model inherits from;
   identify the parent model from the received description of the target model;
   retrieve a description of a set of parameters for generating the parent model, the description of the set of parameters for generating the parent model provided using the programing language syntax;
   generate a pipeline for generating the target model based on the retrieved description of the set of parameters for generating the parent model and the received description of the set of parameters for generating the target model, the pipeline, wherein the generated pipeline does not include a reference to the parent model; and
   execute the generated pipeline to generate the target model.

12. The non-transitory computer readable storage medium of claim 11, wherein generating the pipeline comprises:
   modifying a pipeline associated with the parent model based on steps listed in the description of the set of parameters for generating the target model.

13. The non-transitory computer readable storage medium of claim 11, wherein the instructions further cause the processor to:
   select a model architecture based on the generated pipeline; and
   train the target model based on the generated pipeline.

14. The non-transitory computer readable storage medium of claim 13, wherein selecting the model architecture comprises:
   evaluating a plurality of model architectures following a scheme described in the generated pipeline.

15. The non-transitory computer readable storage medium of claim 11, wherein the instructions further cause the processor to:
   receive a modification to the description of the set of parameters for generating the parent model; and
   notify a manager of the target model that the description of the set of parameters for generating the parent model has been modified.

16. The non-transitory computer readable storage medium of claim 11, wherein generating the pipeline for generating the target model comprises generating a configuration file for configuring a hardware for training the target model.

17. The non-transitory computer readable storage medium of claim 16, wherein executing the generated pipeline comprises:
   configuring a hardware component for training the target model; and
   training the target model using the hardware component.

18. The non-transitory computer readable storage medium of claim 11, wherein the description of the set of parameters for generating the target model is provided as a class written using the programming language syntax, the class inheriting from a second class corresponding to the parent model, the class further including a function for defining the pipeline of the target model.

19. The non-transitory computer readable storage medium of claim 11, wherein the function for defining the pipeline of the target model including one or more steps for modifying a pipeline of the parent model.

20. The non-transitory computer readable storage medium of claim 18, wherein generating a pipeline comprises:
   executing the function defining the pipeline of the target model.

* * * * *